Patented Oct. 12, 1948

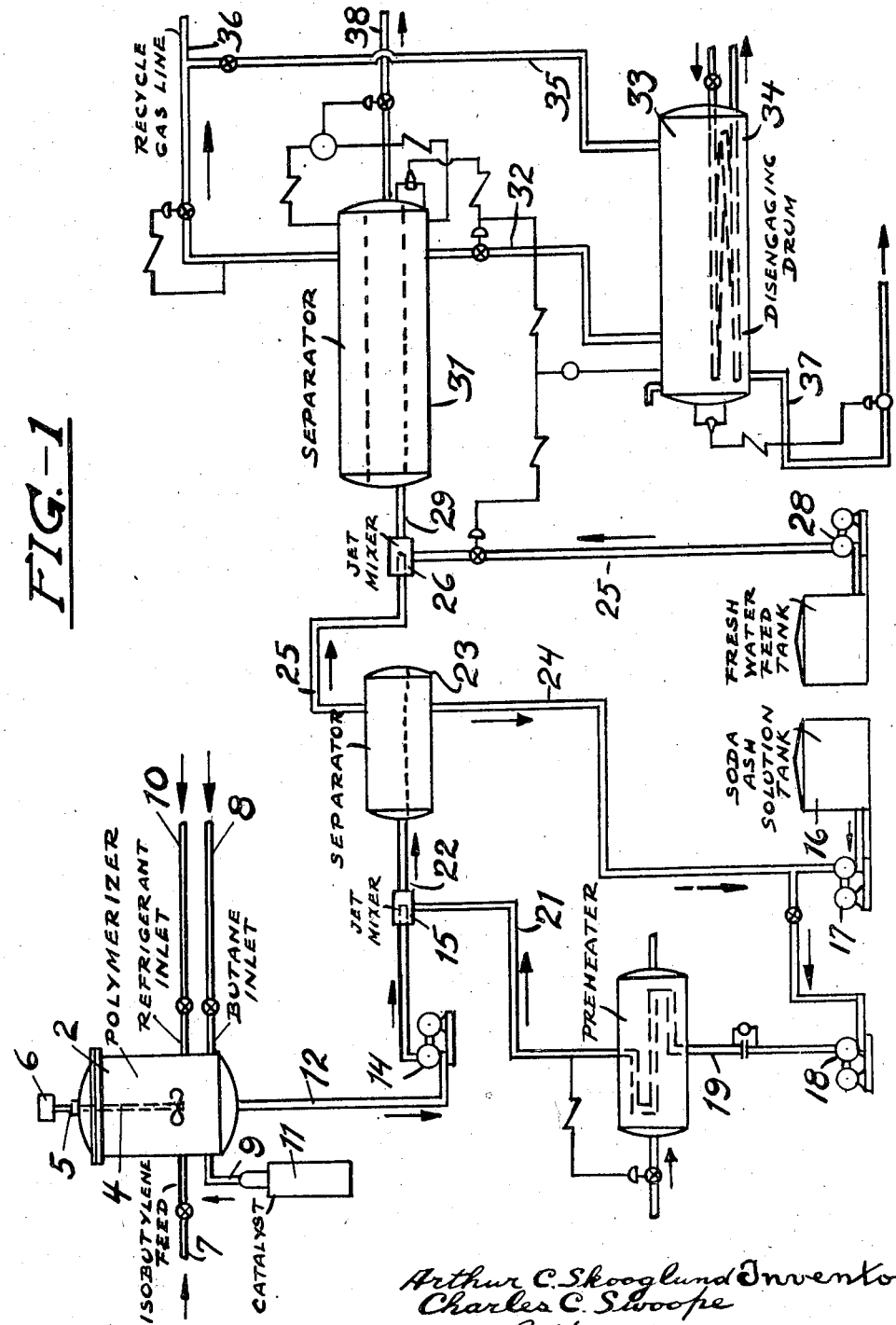

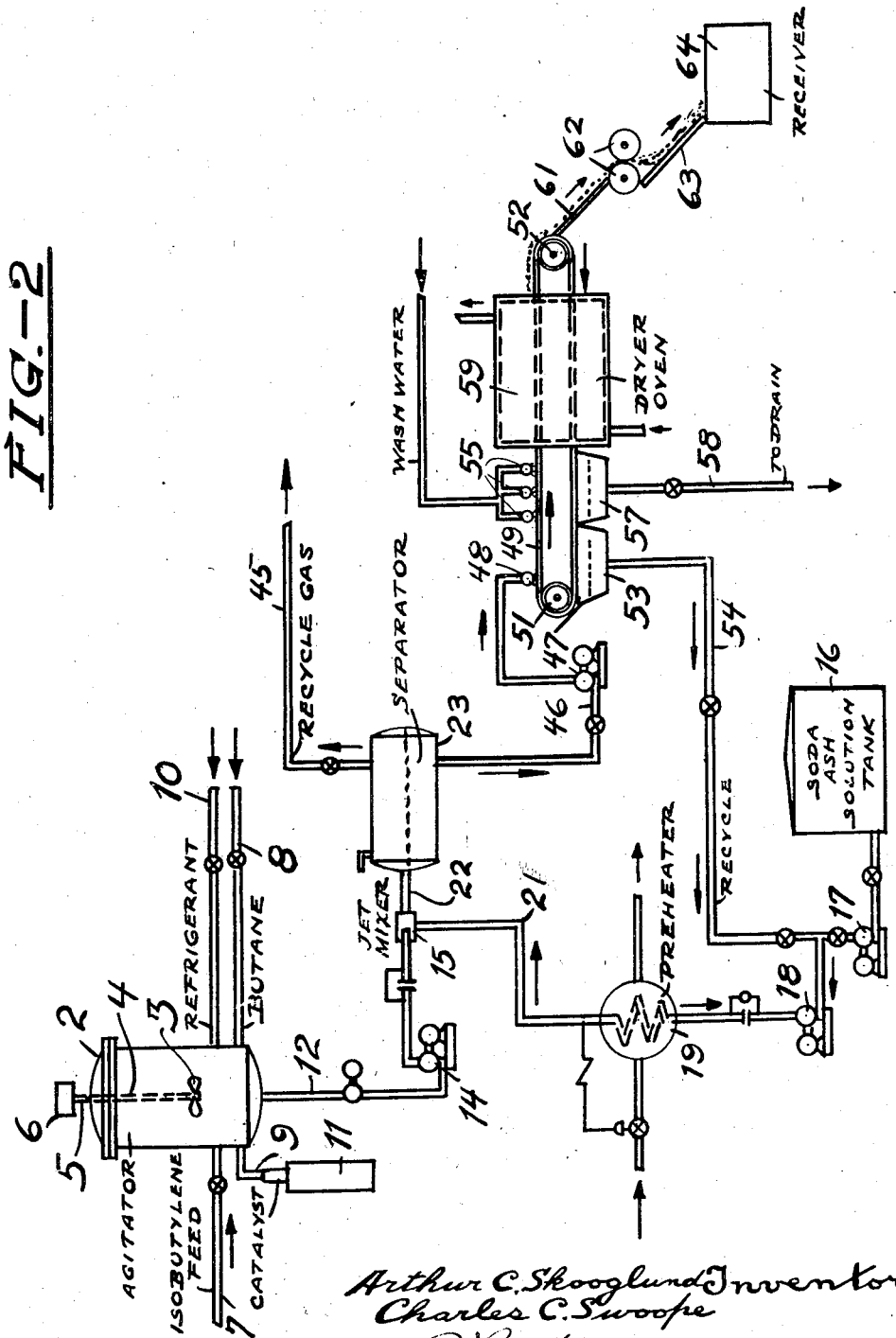

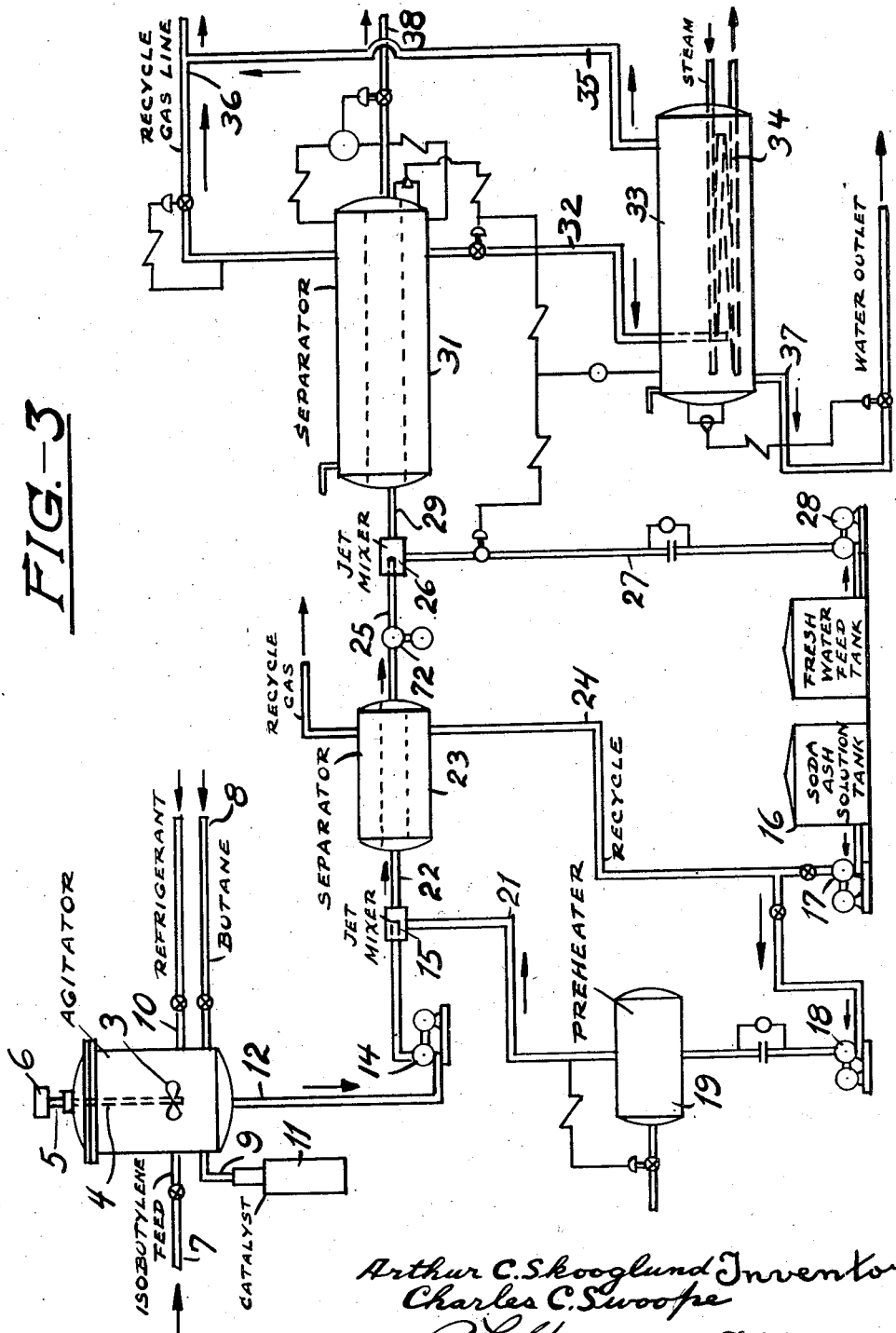

2,451,047

UNITED STATES PATENT OFFICE 2,451,047

POLYMER RECOVERY FROM LOW-TEMPERATURE POLYMERIZATION OF OLEFINIC MATERIAL

Arthur C. Skooglund, Clark Township, Union County, and Charles C. Swoope, Union, N. J., assignors to Standard Oil Development Company, a corporation of Delaware Application May 14, 1943, Serial No. 486,980

11 Claims. (Cl. 260—93)

1

This application relates to low temperature olefinic polymers, relates particularly to the processing of low temperature olefinic polymers, and relates especially to methods for the recovery of low temperature polymers from solution and the neutralization and removal of the polymerization catalyst.

It has been found possible to prepare low temperature polymers of an isoolefin such as isobutylene in solution in a convenient solvent such as butane, propane, ethylene, and the like, to yield polymers having molecular weights ranging from 1000 to 10,000, 15,000 or 20,000 by the application thereto of a Friedel-Crafts catalyst such as boron trifluoride or aluminum chloride in solution, or the like, to yield a sticky, semi-fluid polymer which is extremely valuable as a lubricating oil additive for improving the viscosity and viscosity index. For such uses, however, it is desirable that the polymer should be neutral, and free from catalyst material. However, the very sticky, semi-fluid character of the polymer makes it extremely difficult to wash or process for the removal of catalyst residues.

The present invention provides a simple method for recovering the polymer from the polymerization mixture and destroying the catalyst and removing it from the polymer.

Broadly the procedure consists in the steps of delivering a jet of the polymer solution at low temperature under relatively high pressure into a stream of warm aqueous alkaline material: The turbulence resulting from the rapid flow of the intermixing two streams serving to produce an intimate admixture of the cold polymer solution of the warm aqueous alkaline solution. The temperature and pressure relationships of the resulting mixture preferably are such that the solvent remains liquid at the elevated temperature, and the intimate admixture of the alkaline aqueous material with the polymer solution results in a very thorough hydrolysis of the catalyst and removal of the hydrolyzed catalyst from the polymer solution into the alkaline water solution. The mixture is then settled to separate the two solutions, the alkaline solution being removed and recycled with sufficient fresh solution to maintain the necessary alkaline strength. The polymer solution is then washed under similar conditions with clear water to remove any residual traces of alkaline material and any possible traces of unseparated inorganic catalyst material. After this washing step, the mixture is settled and the water discarded while the polymer solution is transferred to the flash stills in which the polymer solution in butane is converted to a polymer solution in light lubricating oil and the butane is separated for reuse.

Alternatively, if the polymer is desired by itself, rather than in oil solution, the polymer after washing and settling, may be transferred to flash stills of the type shown in United States Patent 2,235,127, issued to Tyson, in which the volatile components are driven off and the polymer in fluid condition is allowed to flow into a receiver and recovered in pure form, free from solvents and catalyst substances.

Also, the procedure may be conducted at atmospheric pressures, rather than at elevated pressures, in which case the polymer is processed, in part, in the form of a slurry in alkaline solution, and washed as a slurry in water, whereafter it may be recovered from the slurry in pure form, or may be dissolved from the slurry in light oil.

Thus an object of the invention is to hydrolyze the catalyst in a low temperature polymer solution and remove the catalyst and hydrolytic agent from the polymer solution to produce a particularly pure solution of polymer in liquefied hydrocarbon refrigerant or a slurry of pure polymer which is particularly valuable for the production of an oil solution of polymer which is substantially wholly free from inorganic impurities. Other objects and details of the invention will be apparent from the following description when read in connection with the accompanying drawing wherein Fig. 1 is a diagrammatic view or flow sheet of the device and process of the invention operating at elevated pressures;

Fig. 2 is a diagrammatic view or flow sheet of an alternative embodiment operating at atmospheric pressure on solid polymer, and Fig. 3 is a diagrammatic view or flow sheet of still another alternative embodiment for liquid polymer.

Referring to the drawing, there is provided a polymerization reactor 1 having a removable cover member 2. Within the reactor 1 there is provided a stirrer 3 carried upon a shaft 4 which passes through a stuffing box 5 and is driven by a motor 6. The reactor is surrounded by a heat insulating jacket or by a refrigerating jacket (not shown). A supply of liquid isobutylene is delivered to the reactor 1 through a feed pipe 7 and a supply of solvent such as butane is delivered through another feed pipe 8. Simultaneously a refrigerant preferably in the form of liquid carbon dioxide is delivered through a pipe member 10 to the polymerizer 1. The liquid carbon dioxide partially dissolves in the butane-isobutylene solution and yields a polymerization temperature of approximately −70° C. A supply of catalyst in the form of gaseous boron trifluoride is delivered to the reactor 1 through a pipe member 9 from a catalyst storage supply 11. When the polymerization reaction is complete, the solution of polymer is discharged from the reactor 1 through a pipe 12 to a pump 14 which delivers it under a pressure of approximately 400 pounds per square inch to a jet mixer member 15.

Simultaneously a solution of soda ash is prepared in a storage tank 16, the concentration of soda ash in the solution being approximately 25%. The soda ash solution is delivered by a pump 17 to a circulating stream in which the liquid is circulated by a second pump member 18 through a heater coil 19 in a steam drum. In the heater 19 the soda solution is raised in temperature to approximately 90° F. and delivered through a pipe member 21 to the jet mixer 15. The cold butane solution at a temperature of approximately −70° C. is mixed by a spraying or atomizing action in the jet mixer in the ratio of approximately one part of cold butane solution of polymer to approximately 10 parts of warm soda ash solution. From the orifice mixer 15 the mixed solutions are delivered through a pipe 22 to a settling tank 23. In the settling tank 23 the aqueous soda ash solution settles to the bottom and is delivered through a pipe 24 to the pump 18 for recirculation. The polymer solution in butane rises to the top and is delivered through a pipe 25 to a second jet mixer 26. In the jet mixer 26 the butane solution is washed in the ratio of one part to 5 parts of fresh water delivered through a pipe 27 by a pump 28. The mixture of water and butane solution is delivered from the mixer 26 through a pipe 29 to a settling tank 31 in which the water and polymer solution are separated. These process steps are all conducted under pressure, as determined by the boiling point of the mixture at the washing temperature. There usually is sufficient residual carbon dioxide present in the mixture, usually all in solution, to raise the pressure to about 400 pounds to the square inch. However, this operating pressure depends in part upon the amount of carbon dioxide present in the polymerization product, and in part upon the temperature at which the processing is conducted. If, as may sometimes occur, substantially all of the carbon dioxide is volatilized by the heat of polymerization, the pressure may be greatly reduced, since only the pressure of the isobutylene at the operating temperature is left. The wash water is discharged through a pipe line 32 to a disengaging drum 33 having a steam coil 34 therein. The steam coil boils out from the water any residual quantities of dissolved butane which is delivered through a pipe 35 to a recycle gas line 36. The water freed from butane is discharged from the drum through an outlet pipe 37. The polymer solution is discharged from the drum 31 through a pipe line 38 to a flash still (not shown). In this flash still, as has been customary in the prior art, the butane solution is mixed with a good grade of light or medium lubricating oil. All of the polymer and much of the butane dissolves in the light oil which is then heated by a steam coil to a temperature sufficiently high to disengage most of the butane. The solution of polymer in lubricating oil is then transferred to a second still where it is further heated to drive out the last traces of butane and any other volatile components. The solution of polymer in lubricating oil delivered from the second still is then ready for shipment or for mixing with additional lubricating oil to make a high-grade lubricating oil.

The process as above described yields a solution of polymer in lubricating oil. However, in some instances, it is desirable to recover the polymer free from lubricating oil. This is readily accomplished by the utilization of the flash still system shown in Tyson Patent No. 2,235,127, the present washing steps being interposed between the polymerizer of the Tyson patent and the pressuring drum of the Tyson patent.

Broadly, the operation of the process of the present invention consists in the mixing, with high turbulence, of the cold polymer solution at a temperature of approximately −70° C. with a relatively much larger quantity of warm alkaline solution under a sufficiently high pressure to avoid volatilization of the polymer solvent, to permit of a thorough washing of the polymer solution at a fairly elevated temperature; followed by a second wash under similar high pressure with clear water to complete the purification of the polymer solution while in solution in the original solvent. The preferred temperature of operation is approximately 80 to 90° F., at which temperature the pressure ranges between 400 pounds per square inch and 500 pounds per square inch.

It may be noted that while the final temperature of operation is approximately 80 to 90° F., and the pressures range between 400 pounds and 500 pounds per square inch, the neutralization in the jet mixer is accomplished at much lower temperatures. It is well settled that when isobutylene is warmed up, in the presence of a polymerization catalyst, further polymerization occurs to yield polymers having molecular weights which are an inverse function of the temperature, and if the mixture containing both isobutylene and polymerization catalyst is warmed up, considerable amounts of dimer and trimer are produced, which are extremely undesirable in the finished polymer product. However, the present procedure obtains such an intimate admixture between the alkaline solution and the polymer solution in so short a time, that the catalyst is neutralized before there is sufficient time available for any substantial amount of undesired polymerization to occur. That is, the high speed of flow of polymer solution through the jet mixer diffuses the polymer solution in fine droplets in the soda solution with extreme speed, providing a very great amount of surface interface between the polymer solution and the alkaline solution, through which the catalyst diffuses with extreme speed resulting in the complete quenching of the catalyst before any perceptible high temperature polymerization can occur for the production of dimer and trimer.

The process of the invention is not however limited to the production of especially pure lubricating oil thickeners and viscosity index improvers, as above described, but is applicable also to many other types of polymers.

It has been found possible by the use of a mixture of an isoolefin in major proportion with a polyolefin in minor proportion to produce a high molecular weight polymer which is reactive with sulfur in a curing procedure to yield a very high-grade rubber substitute.

In practicing this alternative embodiment of the invention, the reactor 1 may be charged through a line 7 with a feed consisting of a major proportion of an isoolefin, preferably isobutylene, although other isoolefins are usable for certain purposes, in admixture with a polyolefin such as butadiene, isoprene, piperylene, dimethyl butadiene, dimethallyl, myrcene, and the like, the usable range of polyolefins including most of the polyolefins having from 4 to 12 or 14 carbon atoms per molecule. The composition of the olefinic material feed preferably consists of from 70 to 99.5 parts of the isoolefin with from 30 to 0.5 part of the polyolefin, according to the particular polyolefin chosen; according to the catalyst used; and according to the temperature of polymerization. The olefinic material is cooled to a temperature preferably lying between the range of −40° C. and −100° C. or −127° C., or even as low as −164° C. The refrigerant is preferably accomplished by the use of a refrigerating jacket surrounding the reactor 1 (not shown). A solvent for the reaction material is preferably added through the supply line 8. This solvent conveniently may be carbon disulfide in which the polymerization reaction occurs quite readily, as is well shown by the copending application filed for Nelson and Small on June 6, 1942, Serial Number 446,052, now Patent No. 2,400,129. Carbon disulfide is an excellent solvent for the olefinic material, and is also an excellent solvent for the resulting polymer. An auxiliary direct internal refrigerant may be added through the line 10, if desired, the preferred method of operation being the utilization of a refrigerating jacket on the reactor 1 containing liquid ethylene, with the addition of relatively small quantities of liquid ethylene to the reaction mixture to prevent the development of hot spots in the body of the reactant mixture.

The catalyst for this reaction preferably consists of a Friedel-Crafts type catalyst in solution in a low-freezing, non-complex-forming solvent. The preferred catalyst is a solution of aluminum chloride in ethyl or methyl chloride or carbon disulfide. However, any of the Friedel-Crafts catalysts disclosed by N. O. Calloway in his article on the "Friedel-Crafts Synthesis" printed in the issue of "Chemical Reviews" published for the American Chemical Society at Baltimore in 1935, in volume XVII, Number 3, the article beginning on page 327, the list being particularly well shown on page 375 may be used. For the catalyst solvent, substantially any of the mono or poly alkyl halides having freezing points below about −24° C. are usable. The catalyst may be added through the supply pipe 9 under pressure from a storage reservoir 11. However, the preferred method of catalyst addition is in the form of a fine spray applied to the surface of the reaction mixture in the reactor 1 through a supply pipe entering through the cover 2, terminating in a suitable spray head (not shown).

In the operation of this embodiment of the invention, the olefinic material feed and solvent added to the refrigerated reactor 1, and the catalyst solution is then added, as above outlined. The reaction proceeds promptly and may be complete in from 5 to 15 minutes to yield a relatively heavy solution of polymer in carbon disulfide.

The resulting polymer conveniently may have a molecular weight within the range from 20,000 to about 100,000, although, if desired, the molecular weight can be raised to values as high as 250,000 or even higher. The resulting polymer likewise has a moderately low, controlled iodine number which is readily brought within the range from 1 to 40 or 50.

When the polymerization reaction is complete, the polymer solution is discharged from the reactor 1 through the pipe 12 by the pump 14 to the jet mixer 15 where, as in the prior embodiment, it is mixed under conditions of high turbulence and substantial pressure with a warm or hot alkaline solution delivered by the pump 18 through the heater 19 and pipe 21. As in the prior embodiment, the mixture is discharged through the pipe 22 to a settling tank 23 where the alkaline solution is separated from the carbon disulfide solution of polymer. It may be noted that when a light hydrocarbon serves as solvent, the polymer solution is lighter than water, and floats on the surface of the alkaline solution, whereas when carbon disulfide is used, it may be enough heavier than water to sink to the bottom of the settler 23 depending on the soda concentration and the polymer concentration. Accordingly, in this embodiment, the points of connection of the pipes 24 and 25 may be reversed and the soda ash solution drawn off from the top of the settler 23 through the pipe 24 and returned to the pump 18 for recycling, while the carbon disulfide solution of polymer may be drawn off from the bottom of the settler 23 and delivered through the pipe 25 to the second jet mixer 26, where the polymer solution is again mixed under conditions of high turbulence with a supply of fresh wash water. From the second mixer 26, the mixture of polymer solution and water is delivered to the second settler 31, where, as in settler 23, the water may float on the surface and the carbon disulfide solution of polymer may settle to the bottom. Accordingly, in settler 31, the point of connection of the discharge pipes 32 and 33 also may be reversed, thereby delivering the water to the disengaging drum 33 and the polymer solution to a further separating means.

When the mixed polymer or copolymer or interpolymer of a diolefin with a polyolefin is prepared, it usually is desired in solid form, rather than in solution in a light oil. Accordingly, the polymer solution delivered through the pipe 33 may be cooled to a temperature below the boiling point of carbon disulfide, preferably to a temperature between 20° and 30° C. and then delivered to a suitable receptacle where a substantial quantity of a suitable alcohol such as ethyl or propyl or butyl alcohol is added to the polymer solution. The alcohol serves to precipitate the polymer in solid form from the solution, and the polymer is readily strained out from the carbon disulfide solvent. The solid polymer may then be washed with alcohol to remove as much as possible of the carbon disulfide and may then be washed with further quantities of water to remove the last traces of alcohol, this latter washing being preferably conducted on an open roll mill at a temperature of from 80 to 100° C. in order to volatilize the last traces of carbon disulfide and any residual traces of olefinic material and refrigerant.

The carbon disulfide-alcohol mixture from which the polymer is precipitated may then be heated in a suitable receiver to volatilize out the carbon disulfide which is preferably passed through a fractionating column to yield as pure a carbon disulfide as possible. Any residual traces of olefinic material or refrigerant are likewise removed from the carbon disulfide and they may be repurified and recycled. Likewise any undesirably low molecular weight material which may have been produced during the polymerization may be retained in the carbon disulfide solution after the precipitation step by suitable adjustment of the amount of alcohol added. That is, a fractional precipitation of polymer is possible to yield only polymer above some limiting minimum molecular weight, any material below that molecular weight being retained in solution in the carbon disulfide, and separated therefrom during the purification of the carbon disulfide. If higher boiling alcohols such as propyl or butyl are used, a slurry of the lower molecular weight polymer in alcohol may be retained in the receiver and discharged therefrom for further purification to recover the alcohol by straining out or settling out the polymer, depending upon its physical condition as a solid or liquid.

The resulting high molecular weight polymer is found to be reactive with sulfur in a curing reaction to yield a highly valuable synthetic rubber. Thus the polymer, after washing and drying on the roll mill, may be compounded according to the following recipe:

|  | Parts by weight |
| --- | --- |
| Copolymer | 100 |
| Stearic acid | 5 |
| Zinc oxide | 3 |
| Sulfur | 3 |
| Tuads (tetra methyl thiuram disulfide) | 1 |
| Carbon black | 10 |

This material, after curing at a temperature of approximately 137° C. under pressure for approximately 30 minutes was cut into test samples and showed a tensile strength of approximately 2500 pounds with an elongation at break of approximately 1100%.

The preferred embodiment of the invention, as above pointed out, preferably maintains the polymer solution under such conditions of temperature and pressure as to prevent volatilization of the solvent. This, however, is not essential to satisfactory operation of the device, especially when carbon disulfide is used as a solvent, since all of the reactions with carbon disulfide may be conducted at temperatures below the boiling point at atmospheric pressure of carbon disulfide. For these conditions of operation, no major changes need be made in the device of the figure, the modification required being reduction in the temperature reached in the preheater 19 and a minor reduction in the speed of operation of the pumps 17 and 28 together with the opening of relief valves to atmosphere.

In another alternative embodiment of the invention as shown in Fig. 2, the polymerizer 1 with its various supply lines, stirrer, drying motor, pumps and the like, is utilized and the polymer solution is delivered as before under a substantial pressure through the jet mixer 15 where it is mixed with warm soda solution as before and delivered to a settling tank 23. This tank, which may be similar in every respect to the tank used for the prior embodiment, is, however, connected through a pipe 45 to a low pressure receiver such as a gasometer for storage of volatilized material preparatory to purification and recycling. The tank 23 is also connected at the bottom through a pipe 46 to a pump 47 which delivers the mixed soda solution and polymer materials to a distributor head 48 which cooperates with a traveling strainer belt 49, passing over rolls 51 and 52. A collecting trough 53 is provided under the head 48 and connected by a pipe 54 to the pump 18 for recycling of the soda solution. A set of spray heads 55 is also provided, connected by a pipe 56 to a wash water supply. A collecting trough 57 is provided under the spray heads 55 and connected by a pipe 58 to a drain. A dryer oven 59 is also provided through which the strainer belt 49 passes; and the dried solid polymer is delivered over a chute 61 to rolls 62 from which it is delivered through a chute 63 to a receiver 64.

This embodiment is particularly applicable to solid polymers prepared in solution in such materials as carbon disulfide or propane, or other materials. In the operation of this embodiment the isobutylene feed with or without other olefinic copolymerizates such as butadiene and its homologues is delivered through the supply pipe 7. Simultaneously, a supply of refrigerant $CO_2$ is delivered through the pipe 10 and a supply of solvent such as butane or carbon disulfide or the like is delivered through the supply pipe 8. The catalyst is conveniently delivered through the supply pipe 9 and the mixture is stirred by the propeller 3 as before (although other types of stirring and polymerizing equipment may be utilized). The polymer solution is delivered through the pipe 12 and pump 14 to the jet mixer 15 where it meets a large excess of warm soda solution delivered through the pipe 21. As in the previously described embodiments the mixture of polymer material and aqueous alkali is delivered through the pipe 22 to the receiver 23. However, the receiver 23 is connected through pipe 25 to a low pressure outlet which is practically at atmospheric pressure. Accordingly, the volatile material vaporizes very rapidly; in fact, the material delivered through the pipe 22 is a mixture of aqueous alkali liquid, having therein a slurried mass of polymer particles in the presence of a relatively large volume of volatilized refrigerent and other materials. It may be noted that the temperature and bulk of the aqueous alkali need to be such that the equilibrium temperature of the mixture is above the freezing point of the alkaline solution, since otherwise the pipes may clog with ice. If butane is used as solvent, the solvent volatilizes. If carbon disulfide is used as solvent, it may or may not volatilize, depending upon the temperature and bulk of alkali solution used. If the bulk of aqueous alkali is small enough so that the final temperature of the mixture is below the boiling point of carbon disulfide, the receiver 23 will have therein a semi-emulsion or mixture of carbon disulfide solution of polymer and volatilized refrigerant. Under such circumstances, the solution of polymer in carbon disulfide may be settled from the aqueous alkali in an equipment closely similar to that of Figure 1 and the polymer solution may be discharged through a second jet mixer and treated as previously described. If, however, the bulk of soda solution is sufficiently large and the temperature sufficiently high to yield a final temperature above the boiling point of carbon disulfide, there results a slurry of solid polymer in the soda solution which may be delivered from the bottom of the receiver 23 through the pipe 26 and pump 27 to a spray head or distributor head 48 by which the slurry is dropped onto a strainer belt 49. The aqueous alkali solution passes through the belt and is collected in the receiver trough 53 and returned by the pipe 54 to the pump 18 for recirculation, leaving a drained mass of solid polymer on the strainer belt 49 which may be washed by wash water delivered from the pipe 56 through the spray heads 55. The wash water is conveniently collected in a receiver trough 57 and through a pipe 58 to drain. The solid polymer on the strainer belt 49 is then conveniently carried through a dryer oven 59 and discharged from the strainer belt 49 over the roller 52 through a chute 61 to processing rolls 62 upon which it is compacted and, if desired, compounded with other substances. The compacted polymer may then be delivered through a chute 63 to packaging equipment 64 preparatory to shipment.

Alternatively, if a liquid or a semi-liquid polymer is prepared, the embodiment of Figure 1 may be utilized with only a minimum of changes for operation at approximately atmospheric pressure as shown in Figure 3. This embodiment is, however, usable only when the solvent for the polymer has a boiling point substantially above the freezing point of water. For this purpose an outlet pipe 71 is provided, connected to a low pressure receiver for recycle gas to be repurified and reused. The pipe 25 is connected to a mid-point of the receiver 23 and a pump 72 is provided and connected in the pipe 25 between the receiver 23 and the second jet mixer 26 in which the polymer solution is washed with clear water. The mixer 26 discharges through the pipe 29 to the second settling tank 31 in which the wash water is settled as before and removed. In this instance, if cold wash water is used, there is little or no material volatilized in the tank 31 to form extra gas, but the wash water is settled out and the polymer solution delivered through the pipe 38 to the precipitators if the polymer is to be recovered by itself and substantially pure, or other lubricating oil dissolvers or "flash stills" if an oil solution of polymer is to be prepared.

In the operation of this device the polymerization mixture is prepared in the polymerizer 1 as before described, the polymerization is conducted in the usual manner and the solution of polymer is delivered through the jet mixer 15 and mixed with a large excess of warm aqueous alkali as before. The volatile components are vaporized as before and delivered through the pipe 71 to a low pressure receiver from which they are taken to purifying and recycling equipment. The aqueous alkali is settled out from the polymer solution, the delivery pipes from the receiver 23 being connected according to the relative densities of the polymer solution and water, and according to the position of the polymer solution on top or beneath. From the receiver 23 the liquid polymer solution is then delivered through the jet mixer 26 for a further washing with clear water and the aqueous alkali is returned to the pump 18 for reheating and recirculation. The wash water and polymer solution are recycled in the receiver 31 as before and the polymer solution is delivered through the outlet pipe 38 for further processing as desired.

Alternatively, if the polymer is prepared in solution in a low boiling solvent such as butane, which has a boiling point below the freezing point of water, the mixing in the jet mixer 15 is accompanied by volatilization of substantially all of the solvent as well as all of the refrigerant and all of the unreacted raw materials and there results a slurry or emulsion of polymer in aqueous alkali in the receiver 23. This aqueous alkali slurry may be thickened by any convenient means and the thickened polymers consisting largely of polymer delivered through a series of additional settlers or thickeners for a washing operation with clear water. This operation is conducted upon solid polymer at temperatures between 10° C. and 75° C. without any substantial difficulty, especially if the aqueous alkali solution delivered through the pipe 21 to the jet mixer 15 contains in addition a sufficient amount of anti-coalescing material such as carbon black or clay or paraffin or zinc oxide or other suitable material. The thickened and washed slurry may then be dried on a drier belt in the usual way or may be sent directly to dryer rolls according to the requirements of the process.

If a liquid or semi-liquid polymer is prepared in a low boiling solvent such as butane, the processing at room temperature is considerably more difficult, since there results a semi-emulsion of the liquid or semi-liquid polymer in the aqueous alkali which is more difficult to handle. However, this material may be delivered as a moderately thickened emulsion directly to a solvent lubricating oil in which the liquid or semi-liquid polymer emulsion is dissolved out from the aqueous alkali and the aqueous alkali then settled out from the oil solution of polymer, the oil solution being then subjected to any further purifying or processing steps which may be found desirable, the settled out aqueous alkali solution being then returned for recycling.

Thus the device of the present invention provides a simple means for purifying a polymer solution and preparing it for separation of the polymer into other forms.

While there are above disclosed but a limited number of embodiments of the process and apparatus of the present invention, it is possible to produce still other embodiments without departing from the inventive concept herein disclosed and it is therefore desired that only such limitations be imposed on the appended claims as are stated therein or required by the prior art.

The invention claimed is:

1. The process of preparing a purified low temperature olefinic polymer comprising the steps of cooling a liquid solution of olefin hydrocarbon having a carbon atom number within the range between 4 and 10 inclusive carbon atoms per molecule to a polymerization temperature within the range between —40° C. and —164° C. in the presence of a solvent for both the olefinic material and the polymer, polymerizing the olefinic material by addition thereto of a Friedel-Crafts catalyst to yield a cold polymer solution, jetting the cold polymer solution at a temperature within the range between 80° F. and 90° F. and a pressure within the range between 400 and 500 pounds per square inch into intimate admixture with an aqueous alkaline solution to produce turbulent mixing and thereafter separating the polymer from the aqueous alkaline solution.

2. The process of preparing a purified low temperature olefinic polymer comprising the steps of cooling a liquid solution of polymerizable olefin hydrocarbons having a carbon atom number within the range between 4 and 10 inclusive carbon atoms per molecule to a polymerization temperature within the range between —40° C. and —164° C. in the presence of a liquefied normally gaseous solvent, polymerizing the olefinic material by the addition thereto of a Friedel-Crafts catalyst to yield a cold polymer solution at the polymerization temperature, mixing the cold polymer solution in fine droplets with a warm aqueous alkaline solution at a temperature within the range between 80° F. and 90° F., at a pressure within the range between 400 and 500 pounds per square inch thereby producing turbulent mixing to hydrolyze the catalyst while simultaneously increasing the temperature of the polymer solution in the fine droplets to above said polymerization temperature, and thereafter settling out the aqueous alkaline solution from the thus mixed polymer solution under sufficient pressure to prevent volatilization of the liquefied normally gaseous solvent present in the polymer solution.

3. The process of preparing a purified low temperature olefinic polymer comprising the steps of cooling a liquid solution of polymerizable olefin hydrocarbons having from 4 to 10 inclusive carbon atoms per molecule in a solvent to a polymerization temperature within the range between —40° C. and —164° C., polymerizing the olefinic material by addition thereto of a Friedel-Crafts catalyst to yield a cold polymer solution, jetting the cold polymer solution into a larger amount of a warm aqueous alkaline solution at a temperature within the range between 80° F. and 90° F. and a pressure within the range between 400 and 500 pounds per square inch for producing turbulent mixing to thereupon immediately raise the temperature of the polymer solution and hydrolyze the catalyst therein, thereafter settling out the alkaline solution from the polymer solution, and thereafter washing the polymer solution under conditions of high turbulence with clear water and settling the water from the washed polymer solution.

4. The process of preparing a purified low temperature olefinic polymer comprising the steps of polymerizing an olefin hydrocarbon having from 4 to 10 inclusive carbon atoms per molecule dissolved in a solvent at a polymerization temperature within the range between —40° C. and —164° C. with the aid of a Friedel-Crafts catalyst to yield a cold solution of a polymer formed from the olefinic material, injecting the cold polymer solution maintained at the polymerization temperature into a more voluminuos stream of a warm aqueous alkaline solution at a temperature within the range between 80° F. and 90° F. at a pressure within the range between 400 and 500 pounds per square inch under conditions to atomize the injected polymer solution and thereupon warm the atomized polymer solution and effect a thorough hydrolysis of the catalyst in the polymer solution simultaneously, separating the aqueous alkaline solution from the thus injected polymer solution, and thereafter washing the polymer solution under conditions of high turbulence with clear water and settling the water from the washed polymer solution and thereafter separating the polymer from the washed polymer solution.

5. The process of preparing a purified low temperature olefinic polymer comprising the steps of cooling a liquid solution of olefin hydrocarbons having from 4 to 10 inclusive carbon atoms per molecule to a temperature within the range between —40° C. and —164° C. in the presence of a solvent, polymerizing the olefinic material by the addition thereto of a Friedel-Crafts catalyst to yield a cold polymer solution of the polymerized olefinic material in the solvent, mixing said cold polymer solution atomized into fine droplets with a warm aqueous alkaline solution at a temperature within the range between 80° F. and 90° F. at a pressure within the range between 400 and 500 pounds per square inch to produce turbulent mixing, then settling out the aqueous alkaline solution from the thus mixed polymer solution and thereafter dissolving the polymer solution in lubricating oil.

6. The process of preparing a purified low temperature isobutylenic polymer comprising the steps of cooling a liquid solution containing liquefied isobutylene to a polymerization temperature within the range between —40° C. and —164° C. in the presence of a solvent, polymerizing the liquefied isobutylene by the addition thereto of a Friedel-Crafts catalyst to yield a cold solution of high molecular weight polymers formed from the isobutylene in the solvent, atomizing the cold polymer solution and dispersing the atomized cold polymer solution into a warm aqueous alkaline solution at a temperature within the range between 80° F. and 90° F. at a pressure within the range between 400 and 500 pounds per square inch, thereby to raise the temperature of the atomized polymer solution above said polymerization temperature and simultaneously deactivate catalyst present therein, thereafter settling out the aqueous alkaline solution from the polymer solution, washing the polymer solution with clear water and then separating the polymer from the solvent.

7. The process of preparing a purified low temperature olefinic polymer comprising the steps of polymerizing an olefin hydrocarbon having from 4 to 10 inclusive carbon atoms per molecule dissolved in a solvent by the addition thereto of a Friedel-Crafts catalyst at a low polymerization temperature within the range between —40° C. and —164° C. to yield a polymer of the olefinic material with a desired high molecular weight, introducing a cold solution of said polymer in the solvent at said low polymerization temperature into an excess of warm aqueous alkaline solution at a temperature within the range between 80° F. and 90° F. and a pressure within the range between 400 and 500 pounds per square inch under conditions to atomize the polymer solution, maintaining the resulting mixture under a pressure sufficiently high to keep substantially all the polymer solution in liquid form as said mixture is warmed to a final temperature, ranging from about room temperature to about 90° F. and settling out the aqueous alkaline solution from the polymer solution.

8. The process of preparing a purified low temperature olefinic polymer comprising the steps of cooling a liquefied, normally gaseous, olefin hydrocarbon having from 4 to 10 inclusive carbon atoms per molecule to a polymerization temperature within the range between —40° C. and —164° C. in the presence of a liquefied, normally gaseous material which serves as a refrigerant and as a solvent for both olefins and polymer, polymerizing said olefinic material by addition thereto of a Friedel-Crafts catalyst to yield a high molecular weight polymer of said olefinic material dissolved in the solvent and refrigerant, introducing the resulting cold solution of the polymer in the solvent and refrigerant by atomization into intimate admixture with a larger proportion of a warm aqeous alkaline solution at a temperature within the range between 80° F. and 90° F. by atomizing the cold polymer solution under a pressure within the range between 400 and 500 pounds per square inch to keep the solvent and refrigerant in liquid form while the atomized polymer solution is heated from the low polymerization temperature to a final temperature ranging from room temperature up to about 90° F., settling out the aqueous alkaline solution from the polymer solution, and then releasing the pressure to volatilize residual solvent and refrigerant and unpolymerized, normally gaseous, olefinic material.

9. The process of preparing a purified low temperature polymer of isobutylene comprising the steps of cooling liquefied isobutylene to a polymerization temperature within the range between —40° C. and —164° C. in the presence of a liquid solvent and refrigerant which is normally gaseous, polymerizing the isobutylene by addition thereto of a Friedel-Crafts catalyst to yield an isobutylene polymer solution maintained at said polymerization temperature, atomizing the polymer solution at the polymerization temperature, and intimately admixing the atomized polymer solution with a warm aqueous alkaline solution at a temperature within the range between 80° F. and 90° F. at a pressure within the range between 400 and 500 pounds per square inch to produce turbulent mixing, maintaining a sufficiently high pressure on the atomized polymer solution to keep substantially all the polymer solution in liquid form as the atomized polymer solution is heated to above the polymerization temperature by contact with the warm aqueous alkaline solution, settling out the aqueous alkaline solution from the polymer solution, water washing the polymer solution under pressure, then releasing the pressure to volatilize the solvent and refrigerant and unpolymerized isobutylene.

10. The process of preparing a purified low temperature olefinic polymer comprising the steps of cooling a liquid solution of olefin hydrocarbons having from 4 to 10 inclusive carbon atoms per molecule to a polymerization temperature within the range between —40° C. and —164° C. in the presence of a solvent which is a liquefied, normally gaseous compound which is a solvent for both olefin and polymer, polymerizing the olefinic material by addition thereto of a Friedel-Crafts catalyst to yield a cold polymer solution, introducing the cold polymer solution at the polymerization temperature in atomized form into a warm aqueous alkaline solution at a temperature within the range between 80° F. and 90° F. at a pressure within the range between 400 and 500 pounds per square inch to produce turbulent mixing, volatilizing the solvent from the atomized solution to yield a slurry of the polymer in the aqueous alkaline solution and thereafter separating the polymer from the aqueous alkaline solution.

11. The process of preparing a purified low temperature olefinic polymer of high molecular weight comprising the steps of cooling a liquid mixture of iso-butylene and a di-olefin having carbon atom numbers within the range between 4 and 10 inclusive per molecule to a temperature within the range between —40° C. and —164° C. in the presence of a solvent for both olefins and polymer, polymerizing together the iso-olefin and the di-olefin in the presence of a Friedel-Crafts catalyst to yield a cold polymer solution, atomizing the cold polymer solution at the polymerization temperature into intimate admixture with a warm aqueous alkaline solution at a temperature within the range between 80° F. and 90° F. at a pressure within the range between 400 and 500 pounds per square inch to produce turbulent mixing, volatilizing the solvent from the atomized polymer solution to yield a slurry of the polymer in the aqueous alkaline solution and thereafter separating the polymer from the aqueous alkaline solution.

ARTHUR C. SKOOGLUND.
CHARLES C. SWOOPE.

REFERENCES CITED

The following references are of record in the file of this patent:

UNITED STATES PATENTS

| Number | Name | Date |
| --- | --- | --- |
| 2,023,495 | Thomas | Dec. 10, 1935 |
| 2,035,233 | Hochwalt | Mar. 24, 1936 |
| 2,039,364 | Thomas and Hochwalt | May 5, 1936 |
| 2,119,957 | Nealon | June 7, 1938 |
| 2,131,196 | Schneider | Sept. 27, 1938 |
| 2,131,905 | Strezynski | Oct. 4, 1938 |
| 2,221,000 | Kuentzel | Nov. 12, 1940 |
| 2,322,073 | Thomas | June 15, 1943 |